United States Patent [19]

Burns

[11] Patent Number: 4,481,987
[45] Date of Patent: Nov. 13, 1984

[54] METHOD FOR DISPENSING FINE POWDERS

[75] Inventor: James A. Burns, Elizabeth, N.J.

[73] Assignee: Becton Dickinson and Company, Paramus, N.J.

[21] Appl. No.: 461,849

[22] Filed: Jan. 28, 1983

Related U.S. Application Data

[63] Continuation-in-part of Ser. No. 380,505, May 21, 1982.

[51] Int. Cl.$^3$ .............................................. B65B 1/04
[52] U.S. Cl. ........................................ 141/12; 141/71; 141/87; 141/129; 222/352; 222/370
[58] Field of Search ...................................... 141/1–12, 141/37–81, 115–127, 249, 85–93, 129–191, 243–248; 222/352, 370

[56] References Cited

U.S. PATENT DOCUMENTS

| | | | |
|---|---|---|---|
| 2,602,579 | 7/1952 | Carruthers et al. | 141/125 |
| 2,857,938 | 10/1958 | Wahl | 141/71 |
| 3,182,693 | 5/1965 | Sundberg | 141/71 |
| 3,552,454 | 1/1971 | Deming | 141/71 |
| 3,921,681 | 11/1975 | Rebmann et al. | 141/71 |

Primary Examiner—Houston S. Bell, Jr.
Attorney, Agent, or Firm—R. P. Grindle

[57] ABSTRACT

Methods are provided for the controlled simultaneous dispensing of several fine powders into microcontainers which containers are used subsequently for clinical determinations. The method includes sifting the fine powders individually to render the individual particles of each powder to be the same size, and then combining them for the subsequent dispensing procedures. The method contemplates, in addition, the reduction of the individual particles of some powders to provide the equal size requirements, before combining with one or more other powders for the subsequent controlled dispensing procedures.

7 Claims, 8 Drawing Figures

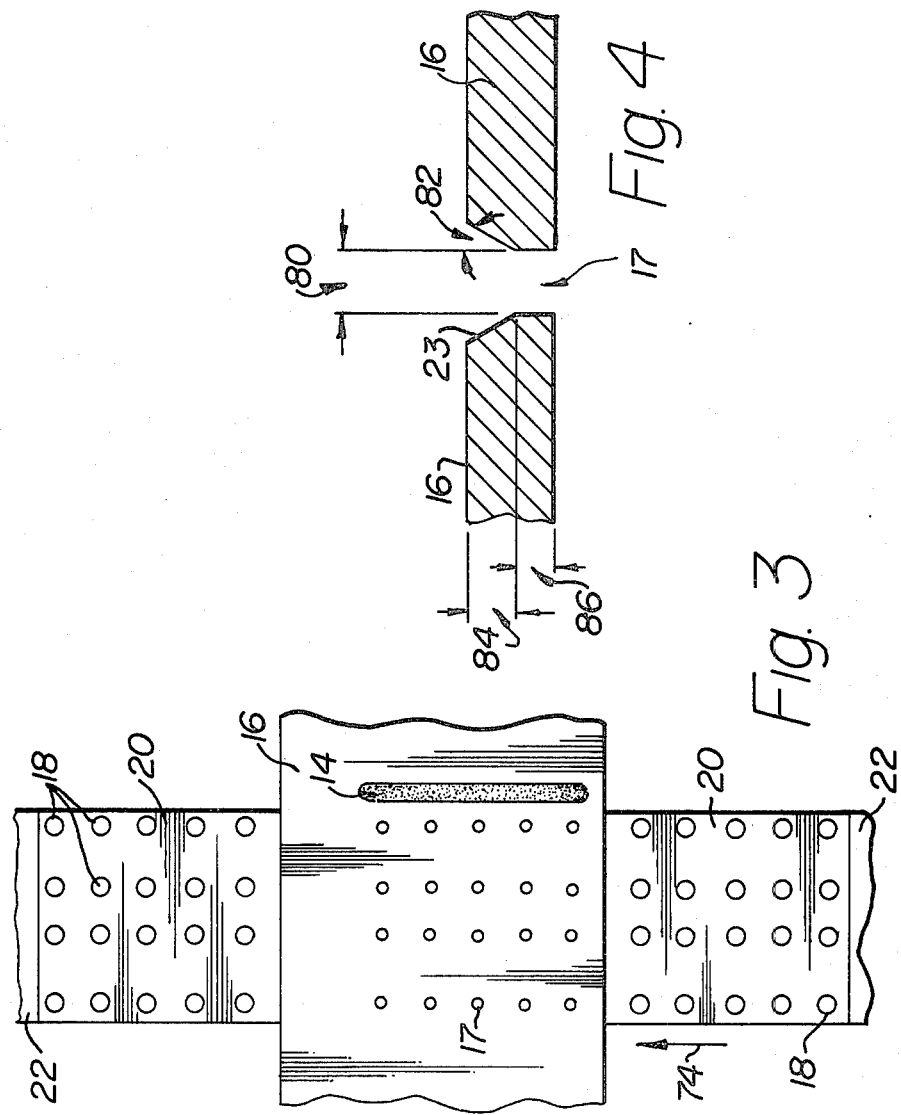

METHOD FOR DISPENSING FINE POWDERS

BACKGROUND AND STATEMENT OF THE INVENTION

This is a continuation-in-part of application Ser. No. 380,505 filed May 21, 1982.

This invention relates generally to methods for dispensing fine powder. More particularly, this invention relates to methods for the controlled dispensing of a plurality of equal quantities of powder into a plurality of containers. The invention is particularly directed to a mass production technique wherein fine powder reagents may be controlled and handled precisely in a production line for dispensing equal amounts simultaneously of several fine powder reagents into a plurality of waiting containers in the line.

The invention includes selecting two or more fine powder reagents, each of which is to be included in thousands of microcontainers being produced for a specific clinical evaluation, sifting the reagents separately to produce quantities thereof having the same particle size (but not necessarily the same shape), combining them in a single batch and then dispensing them in a production line simultaneously into the microcontainers. In this way, only a single run is necessary to dispense into the individual microcontainers, the desired several reagents required for the specific evaluation for which the microcontainers are being produced.

In the handling of powder reagents, one of the difficulties in handling the powder is controlling it so that micro quantities may be dispensed in the proper amount into containers. When several containers are to be filled simultaneously, the control aspect of the situation becomes much more difficult. As will be understood by practitioners-in-the-art, when the powder involved is a reagent for use in medical applications, for example, it is much more necessary that a precise micro quantity of the reagent powder be properly dispensed into each container. The powders as reagents contained in such tubes react subsequently with the addition of blood samples taken from patients in order to provide tests of various physical conditions involved with the patients. It will be understood that if there is any significant variation in the quantities introduced into each container, then the subsequent testing procedures may be affected. Another major problem involved, other than variations in the quantities of the powder being dispensed, of course, is the fact that the powder is easily disturbed in its conveyance from one place to another so that the micro quantities involved with each dispensing procedure are affected.

With this invention, by contrast, methods are provided for the precise controlled dispensing of fine powders. More particularly, the process herein controls and dispenses simultaneously a plurality of quantities of different kinds of such fine powders into a plurality of containers in the precise amounts required so that subsequent testing procedures utilizing the powder reagents will not be affected by any variation in the quantities dispensed.

The invention utilizes, for example, apparatus as described in the aforementioned application Ser. No. 380,505, including a plate having a plurality of bores or openings therein for receiving the individual quantities of powder being dispensed. The bores are configured and dimensioned to provide, in cooperation with the sweeping action of a brush across the plate, accurate micro-sized quantities of powder dispensed substantially simultaneously through each of the individual bores into containers positioned below the bores. For a more detailed description of such apparatus, reference is made to the aforementioned application which is hereby incorporated by reference in its entirety. That apparatus includes an arrangement for depositing a plug of powder of precise quantity onto the plate prior to the dispensing thereof into the individual openings or bores in the plate. That plug will include, in accordance with this invention several reagents of the proper quantity of each, for a single dispensing of those several reagents into the waiting containers.

As discussed above, if the individual particles of one powder reagent are too large to be sifted into a quantity which is to be mixed with another reagent, then the particles are ground to the same size so that they may be sifted through a series of sifters, to be combined subsequently with one or more other reagents, the individual particles of which have also been sifted through the same series of sifters to produce quantities of reagent with the same particle size.

A representative combination of reagents conventionally combined into microcontainers used for clinical evaluations include, for example, sodium fluoride and potassium oxalate for glucose determinations. Other combinations of reagents conventionally included together for subsequent testing procedures include ethylenediamine tetraacetic acid and sodium fluoride, ammonium oxalate and potassium oxalate, thrombin and soybean trytsin inhibitor, and thymol and sodium fluoride. In the past, these reagents have been dispensed separately into the individual microcontainers proceeding through a production line. As will be appreciated, having to direct the same containers through two or more dispensing passes to introduce two or more powder reagents into each container is costly. It is beneficial, as will be understood, to reduce to a minimum the cost of producing such containers, since they are used frequently in areas where cost control is an important factor.

With the foregoing and additional objects in view, this invention will now be described in more detail, and other objects and advantages thereof will become apparent from the following description, the accompanying drawings, and the appended claims.

DESCRIPTION OF THE DRAWINGS

FIG. 3 is a view taken along lines 3—3 of FIG. 1; and

FIG. 4 is an enlarged cross-sectional view of one opening or bore in the powder dispensing plate showing the configuration and dimensions thereof.

DETAILED DESCRIPTION OF THE INVENTION

Figure 1:
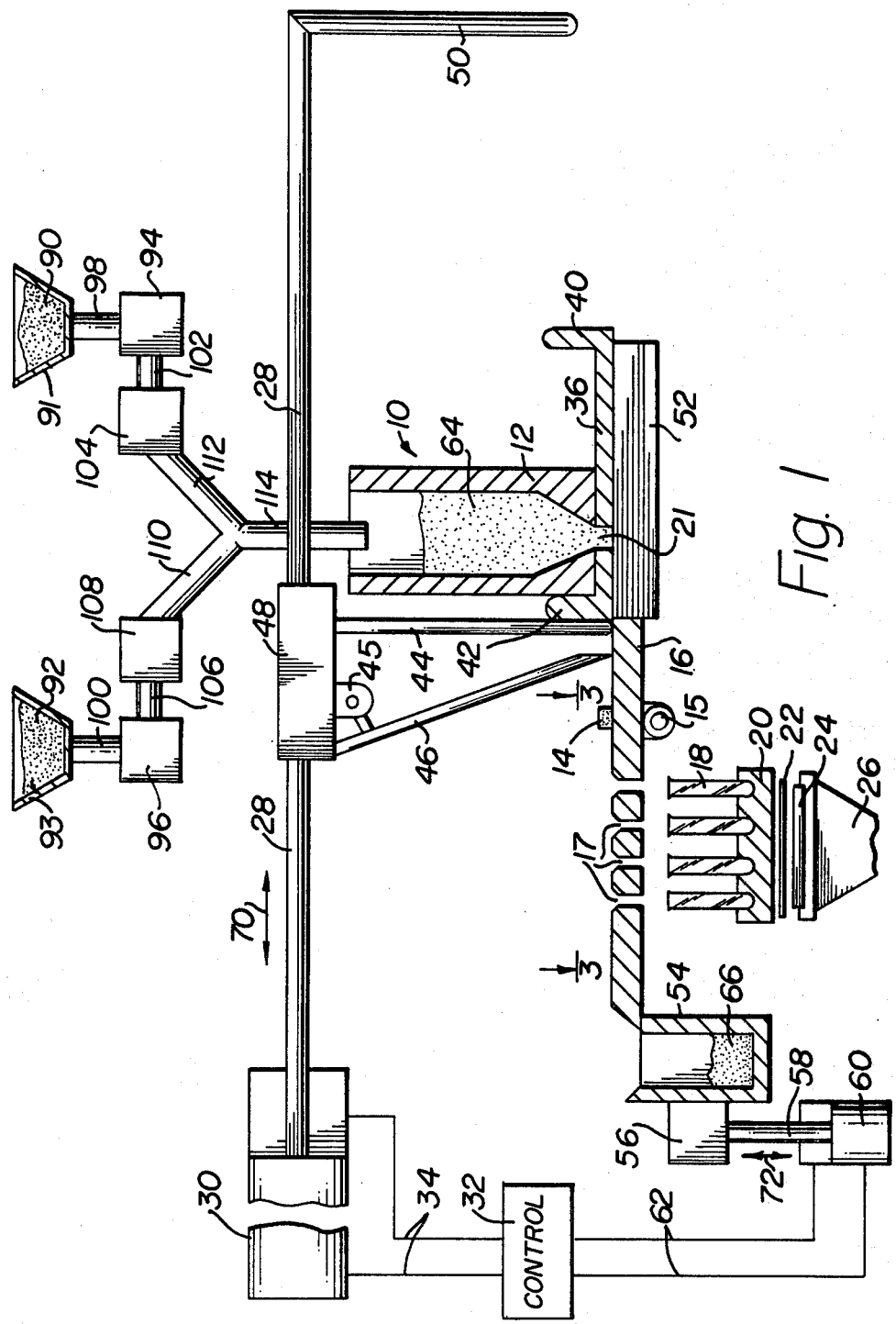
FIG. 1 is a somewhat diagramatic vertical sectional view of apparatus illustrating the invention.

Referring to the drawings in which like reference characters refer to like parts throughout the several views thereof, FIG. 1 shows the dispensing apparatus generally designated 10 having a dispensing plate 16 with openings or bores 17 therein through which openings 17 a slug of powder 14 is dispensed in equal micro quantities. Positioned below each opening 17 is a container 18, which may be in the form of a blood collection tube, for example, for receiving the powder dispensed. Tubes 18 are conveyed in containers 20 for holding the tubes 18. Containers 20 are moved on a conveyor belt 22, which moves along a plurality of spaced rollers 24 as will be appreciated by practitioners-in-the-art, with rollers 24 supported by a base structure 26. Conveyor belt 22 is driven in the usual manner by a driver roller positioned along the length thereof, as will be appreciated.

Positioned adjacent dispensing plate 16 is a fixed table 52 which holds a storage bin 12 for a supply of the combined powder reagents 64 being dispensed. Positioned immediately beneath container 12 is a sliding dispensing table 36 having upstanding arms 40, 42. Table 36 slides from the position shown in FIG. 1 to the position shown in FIG. 2c, as will be described in more detail below, in order to convey a slug of powder 21 (FIG. 1) falling from the supply 64 to a position 14 on dispensing plate 16, as shown in FIG. 1.

Positioned above dispensing plate 16 and table 52 is a push rod 28 which reciprocates from right to left and visa versa, as shown in FIG. 1 by arrow 70 under the action of a reversible motor 30. Rod 28 includes a body 48 from which is suspended a pusher 44 which cooperates with an upstanding arm 42 of slide table 36 for moving the slide table 36 to the right in FIG. 1. By the same token, the pusher 50 shown in FIG. 1 cooperates with the arm 40 on slide table 36 for moving the table to the left as shown in FIG. 1.

Also suspended from body 48 is a brush 46, which moves with push rod 28 to move across the top surface of dispensing plate 16. Such movement of brush 46 serves to move slug 14 and dispense the quantity of powder therein through the plurality of bores 17 in plate 16. As discussed above, other devices such as a squeegee can be used to provide this sweeping action. When the brush 46 moves to the left-hand end of dispensing plate 16, any residual powder from slug 14 falls into waste bin 54 to be collected as waste powder 66. Positioned on one wall of bin 54 is a support bracket 56 for receiving a vertical slide rod 58, which in turn moves vertically in the direction of arrow 72 under the action of reversible motor 60 for vertically moving plate 16 for a purpose to be described below. Reversible motors 30, 60 operate under the action of control 32 so that the movements thereof are in proper sequence for the operation of the apparatus herein. Control 32 is connected with motor 30 through lines 34, and with motor 60 through lines 62.

Positioned on body 48 is a vibration motor 45 which imparts a vibrating movement to brush 46 for enhancing the dispensing of powders from plate 16 through bores 17. Attached to dispensing plate 16 is a vibration motor 15 which serves the same purpose of imparting a vibrating movement to plate 16 for enhancing the dispensing action through bores 17.

With respect to the process of the invention claimed in this application, two or more powders may be combined to form combined powder reagent 64 in hopper 12. That is, one reagent powder 92 contained in hopper 93 passes through passage 100 to a grinder 96 for grinding powder 92 into fine powder particles, as well known in the art. Thereafter, the ground powder particles pass from grinder 96 through passage 106 to a conventional powder sifter 108 which is set for the particle size desired of reagent powder 92. That portion of ground reagent powder 92 which passes through sifter 108 then passes through passage 110 to passage 114 where it is combined with ground and sifted reagent powder 90 from hopper 91. Reagent powder 90 passes through the same process as just described for reagent powder 92, passing through passage 98 to grinder 94, then passage 102 to sifter 104. In accordance with the process of the invention here conventional powder sifter 104 is set to pass the same size particles as sifter 108, so that sifted reagent powder 90 flowing through passage 112 is of the same particle size as sifted reagent powder 92 flowing through passage 112. The two combine in passage 114 to form powder 64 in hopper 12.

Figure 2A:
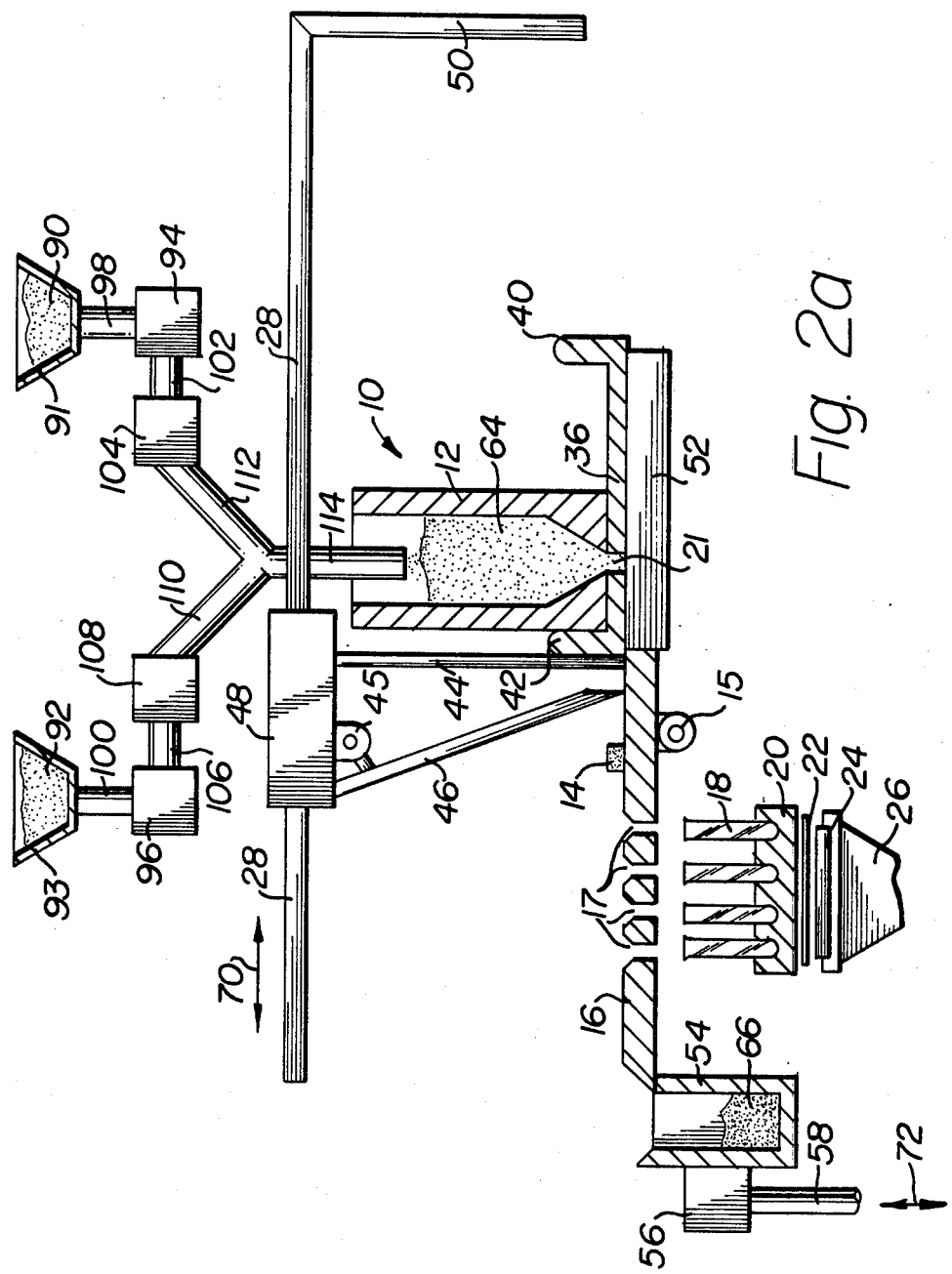
FIGS. 2a–2e are a plurality of views of the apparatus of FIG. 1 with each view showing the apparatus in a different position of movement thereof.

Referring to FIGS. 2a-2e, the sequence of movements of the apparatus shown and described in FIG. 1 is as follows. In FIG. 2a, the powder stored in hopper 12 forms a slug at the bottom of hopper 12 in slot 21 in slide table 36. It is formed of the proper desired size to produce slug 14. A slug of powder 14 was deposited previously on table 16, as shown in FIG. 2a. The conveyor belt 22 has conveyed in a step wise manner a container 20 underneath plate 16, so that individual container tubes 18 are in alignment with bores 17. Table 16 has been moved by motor 60 to its uppermost position, while push rod 28 has been moved to its right-hand position.

Figure 2B:
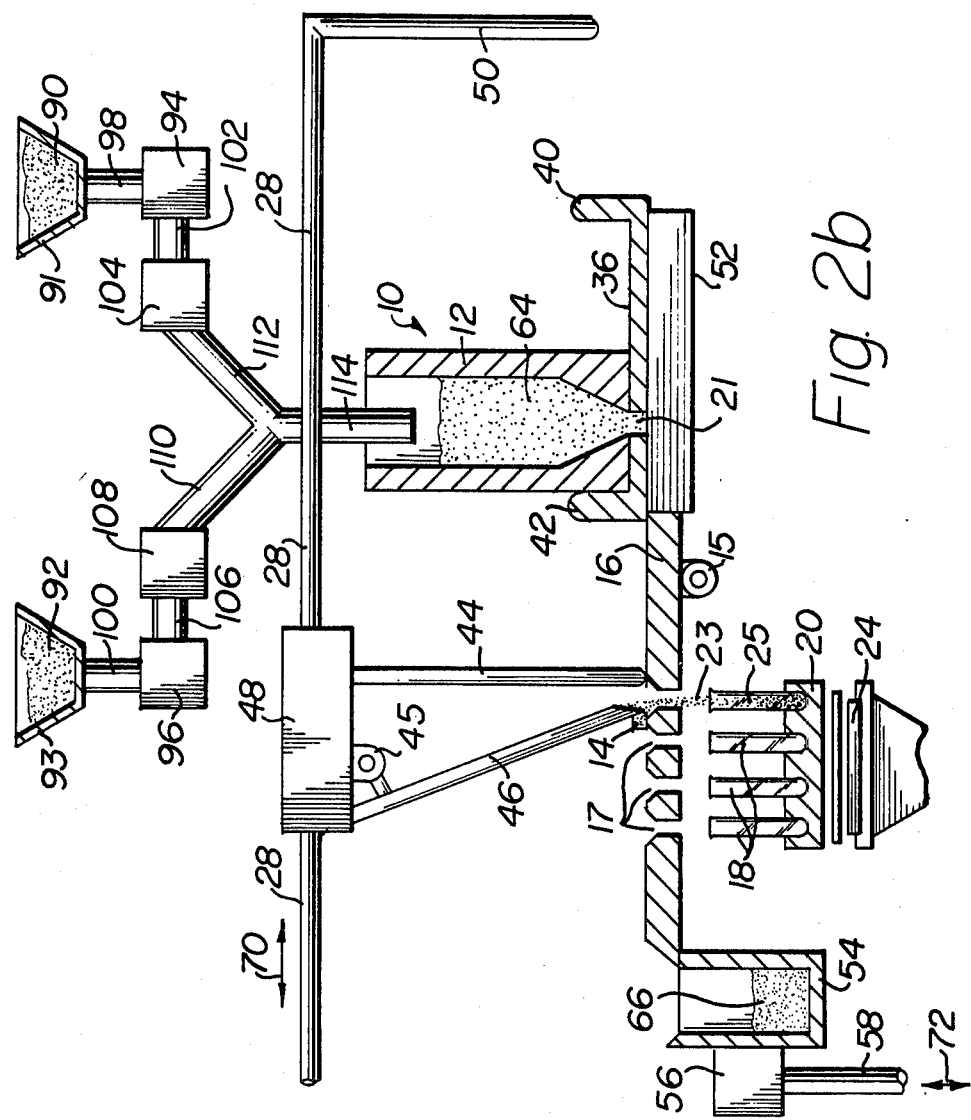

Referring now to FIG. 2b, it will be observed that push rod 28 has been moved by motor 30 to the left under the action of control 32 (it should be noted that motor 30 is dimensioned to provide the proper length of travel of push rod 28 as well known to practitioners in the art. Motor 30 is shown in the diagramatic illustration in FIG. 1 in a small dimension in order to simplify the illustration). At any rate, brush 46 has moved to the left to the position shown in FIG. 2b and has moved slug 14 past the first row of bores 17 for dispensing a portion 23 of the reagent powders being dispensed into a first filled row 25 of tubes 18. Motors 15 and 45 under control 32 are operating during this course of movement so as to impart a vibrating movement to table 16 and brush 46, respectively.

Figure 2C:
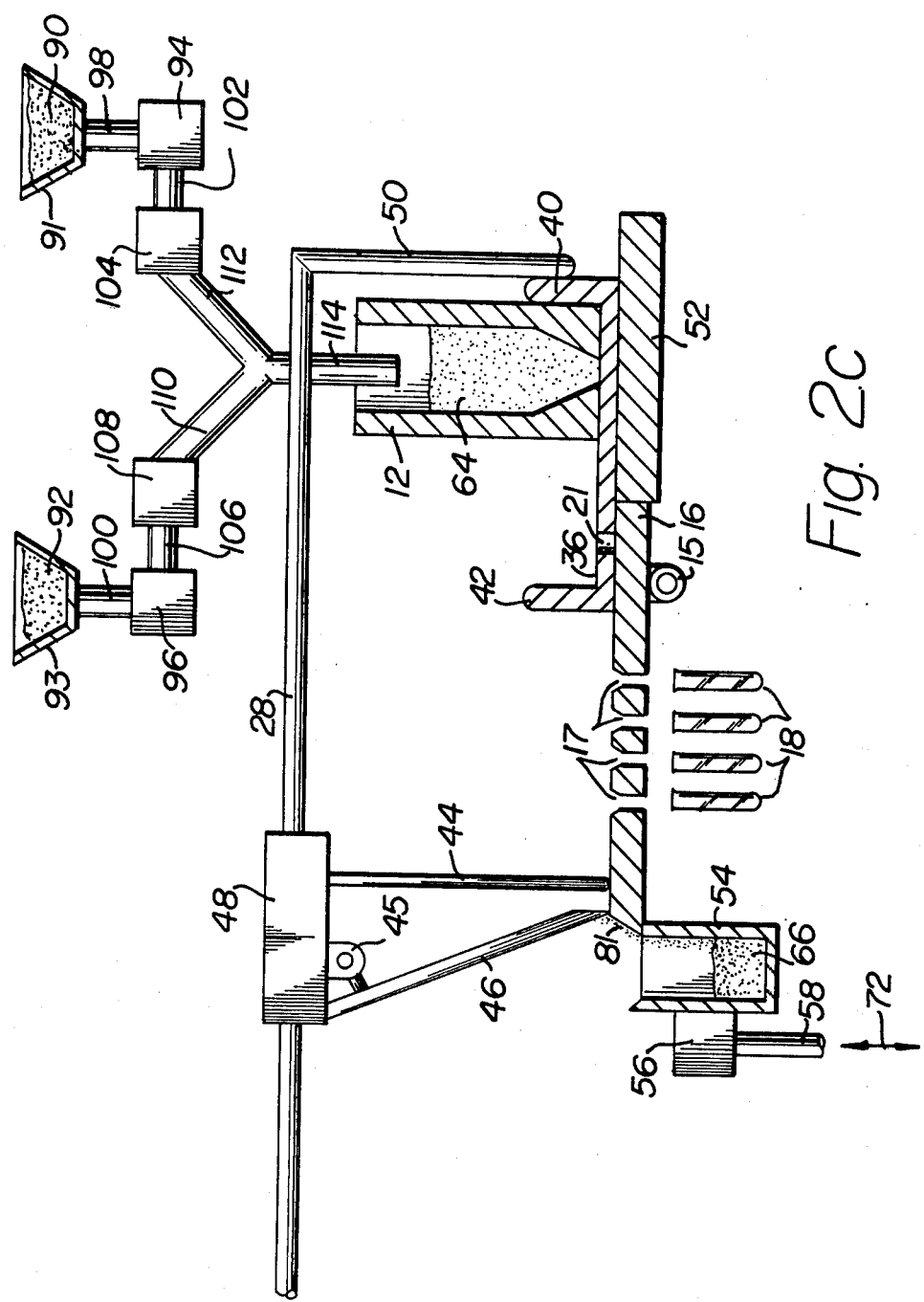

Referring now to FIG. 2c, it will be observed that brush 46 has traversed the entire extent of plate 16 under the action of push rod 28, and the residue 81 of the slug 14 is dispensed into the waste bin 54. During this same left-hand movement of brush 46 under the action or rod 28, pusher 50 has engaged arm 4 of slide table 6 and moved it to the left, so that the left-hand end of slide table 36 has moved onto dispensing plate 16. At this point, each of tubes 18 have been filled with substantially equal micro portions of reagent powders from the original slug 14.

Figure 2D:
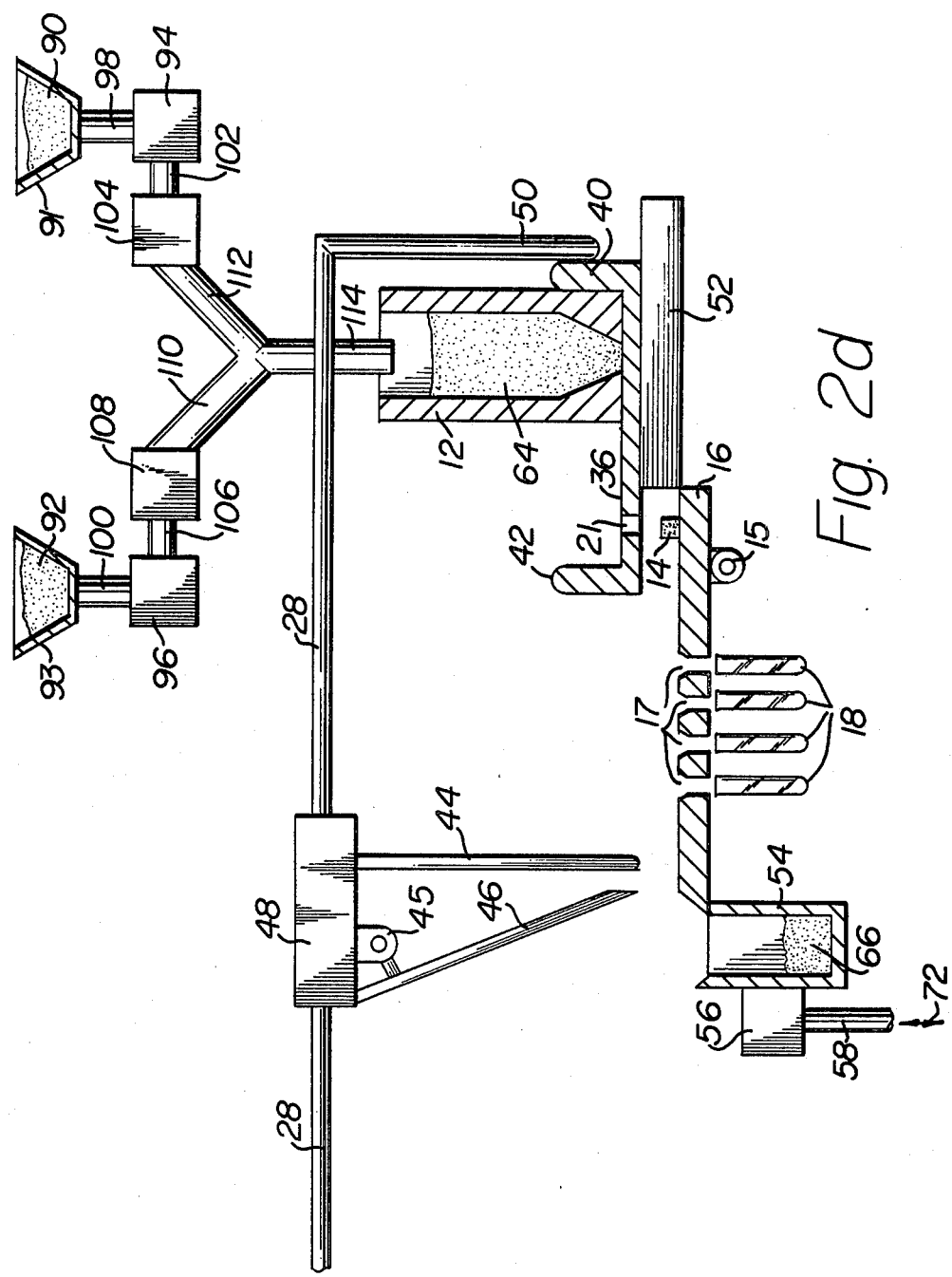

Referring to FIG. 2d, the next movement is the lowering of dispensing table 16 together with the components fixed thereto including bin 54 and bracket 56. This movement is by motor 60 under control 32 (FIG. 1). When table 16 is lowered to the position shown in FIG. 2d, a new slug 14 is left on table 16 from the slide table 36 because the left-hand end thereof is now suspended over table 16.

Figure 2E:
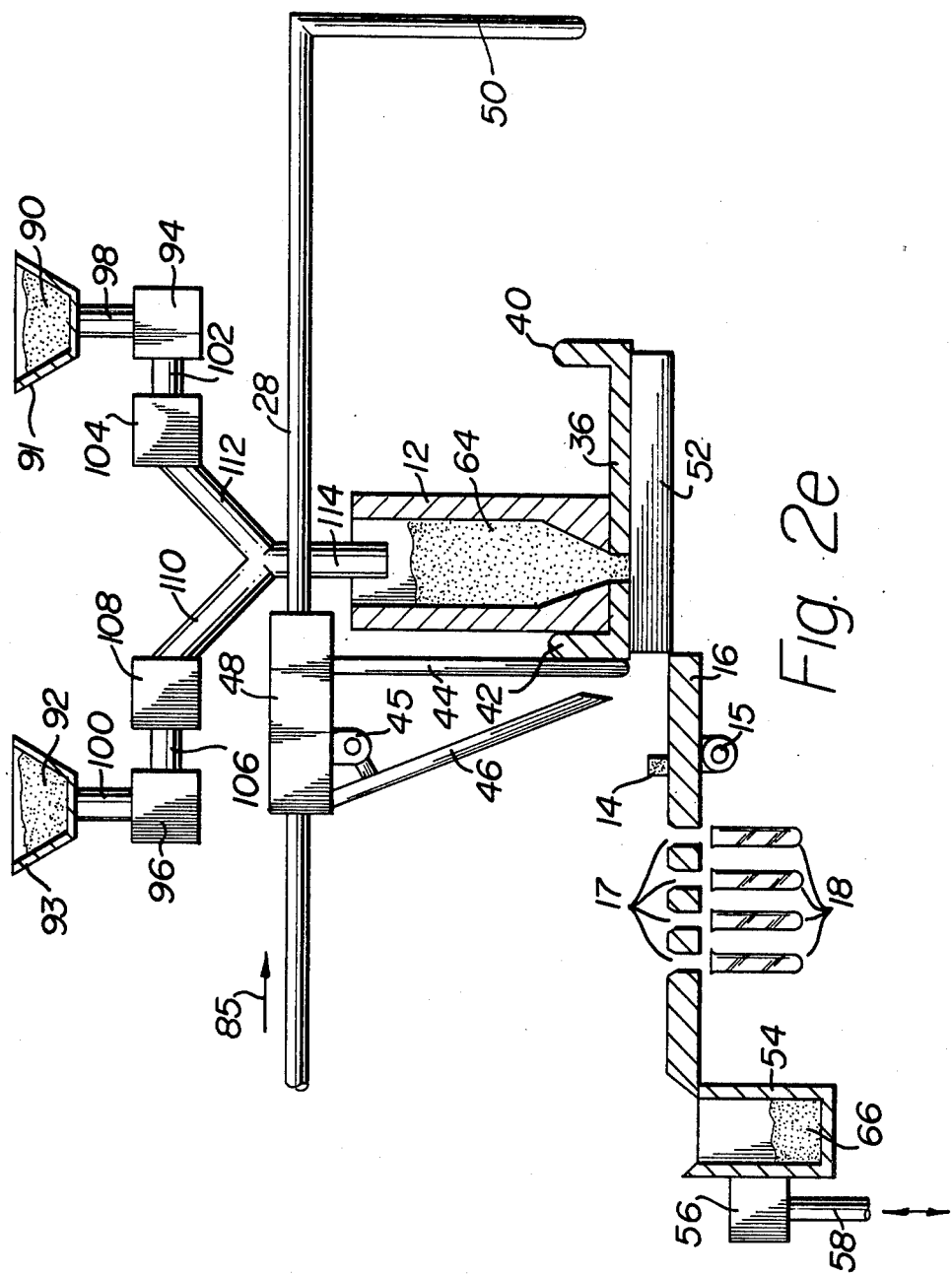

As shown in FIG. 2e, the next movement is the movement to the right of push rod 28 in the direction of arrow 85. This causes pusher 44 to engage arm 42 of slide table 6 for moving slide table 36 back to its original position on fixed table 52. Once this has taken place, dispensing table 16 may be moved vertically upwardly to its original position as shown in FIG. 2a, for a repetition of the sequence of movements. It will be understood, that during this movement of table 16 upwardly, conveyor belt 22 is activated by control 32 to move another container 20 with a new group of empty container tubes 18 adjacent bores 17 for a subsequent filling of a new quantity of container tubes 18. As can be seen in FIG. 3, conveyor belt 22 moves under control 32 in the direction of arrow 74 in a step wise manner in order to move containers 20 adjacent the bores 17 in table 16 for the dispensing of a slug of powder 14 through bores 17.

Referring now to FIG. 4, an enlarged sectional view of a single bore 17 is shown. As purely illustrative of the dimensions which may be utilized for each individual bore 17 for the desired controlled dispensing of powder, the diameter 80 of each individual bore 17 is 0.03 inches. The angle 82 from the axis of bore 17 is 30 degrees. The depth 84 of the converging counter sunk portion 23 of bore 17 is 0.04 inches while the depth 86 of the remaining portion of bore 17 is 0.015 inches. Alternatively, the surface area adjacent bore 17 may be dimpled.

Since several powders may be combined and then dispensed into the individual container tubes simultaneously, and since such very minute quantities of powder reagents are difficult to control in the first place, such a reduction in the handling of such reagents by dispensing two or more at once makes the process of the invention here highly advantageous.

The representative powders, sodium fluoride and potassium oxalate, are individually sifted to obtain quantities thereof wherein the individual particles are of a size within the range of 0.020 inches and 0.025 inches (0.508 mm–0.635 mm). Thereafter, the individually sifted powders are combined and, introduced into the dispensing hopper of apparatus such as that just described.

These combined powders included in each individual microcontainer react as desired to quantities of body fluids introduced into the containers for specific clinical determinations. In glucose determinations, the potassium oxalate acts as an anticoagulant for a blood sample, while the sodium fluoride acts as preservative and inhibitor on certain enzymes present in such determinations. As will be understood, since the accuracy of such determinations is an absolute necessity, the invention herein is important, not only in providing a method for the simultaneous dispensing of several very small quantities of such reagents, but the dispensing in a absolutely controlled fashion to obtain the proper test results. If, for example, the potassium oxalate is dispensed in too large a quantity the hemolysis of blood cells in the test quantity may take place, resulting in an inaccurate determination.

Thus, as will be appreciated from the foregoing, there is provided in accordance with this invention, methods not only for dispensing in micro quantities portions of hard to handle reagent powders, but also an arrangement wherein a plurality of such micro quantities of powder may be dispensed substantially simultaneously utilizing mass production techniques so that the process herein is highly economical. That is, proper control is maintained while still reducing the cost, because the process herein may be incorporated in a continuous line for dispensing a plurality of different materials into the containers in a step wise manner along a production line.

While the methods herein disclosed form preferred embodiments of this invention, this invention is not limited to those specific methods, and changes can be made therein without departing from the scope of the invention which is defined in the appended claims.

What is claimed is:

1. A method for dispensing in a precisely controlled manner micro quantities of a plurality of reagent powders simultaneously into a plurality of containers, characterized by the steps of
    (a) selecting portions of two or more individual reagent powders to be dispensed;
    (b) individually sifting each reagent powder from said selecting step through a set of sifters to obtain each reagent powder in a form wherein the individual particles thereof are of the same size;
    (c) combining said individual reagent powders obtained from said sifting step into a single portion of a plurality of reagent powders; and
    (d) depositing micro quantities of said combined reagent powders from said combining step into a plurality of microcontainers.

2. The method of claim 1, further characterized by said depositing step including the steps of
    (a) utilizing a dispensing plate having a plurality of spaced apart dispensing bores therein of specific dimensions depending upon the desired said micro quantities of said combined reagent powders to be dispensed;
    (b) depositing sequentially on said dispensing plate along one side edge thereof elongated slugs of said combined reagent powders;
    (c) after said depositing step, sweeping a brush across said dispensing plate from said forming step to sweep said slug of combined reagent powders through said dispensing bores;
    (d) receiving the portions of dispensed powder from said sweeping step in a plurality of containers positioned under said dispensing bores; and
    (e) repeating said depositing and sweeping steps while simultaneously moving a new set of containers for said receiving step under said dispensing bores.

3. The method of claim 2, further characterized by
    (a) said utilizing step including said bores having a diameter of 0.03 inches.

4. The method of claim 1, further characterized by
    (a) said selecting step is carried out by selecting sodium fluoride and potassium oxalate.

5. The method of claim 1, further characterized by
    (a) said sifting step being carried out by sifting said individual powders to obtained portions wherein the individual particles thereof are or a size within the range of 0.508 mm and 0.635 mm.

6. The method of claim 4, further characterized by
    (a) said sifting step being carried out by sifting said individual powders to obtained portions wherein the individual particles thereof are of a size within the range of 0.508 mm and 0.635 mm.

7. The method of claim 1, further characterized by
    (a) prior to said sifting step, individually grinding one or more of said reagent powders to form portions thereof containing individual particles of a size which are equal in size to at least a portion of the particles of the other said reagent powders,
    (b) whereby when each individual reagent powder is sifted in said sifting step a quantity of each reagent powder is obtained wherein the individual particles thereof are equal in size to the particles of every other reagent powder.

* * * * *